March 2, 1965 S. P. RONZHEIMER 3,172,047

FREQUENCY-MODULATED SIGNAL DETECTOR

Filed Jan. 24, 1961 2 Sheets-Sheet 1

March 2, 1965 S. P. RONZHEIMER 3,172,047

FREQUENCY-MODULATED SIGNAL DETECTOR

Filed Jan. 24, 1961 2 Sheets-Sheet 2

3,172,047

FREQUENCY-MODULATED SIGNAL DETECTOR

Stephen P. Ronzheimer, Elmhurst, Ill., assignor to Hazeltine Research, Inc., a corporation of Illinois Filed Jan. 24, 1961, Ser. No. 84,637
12 Claims. (Cl. 329—126)

*General*

Figure 1:
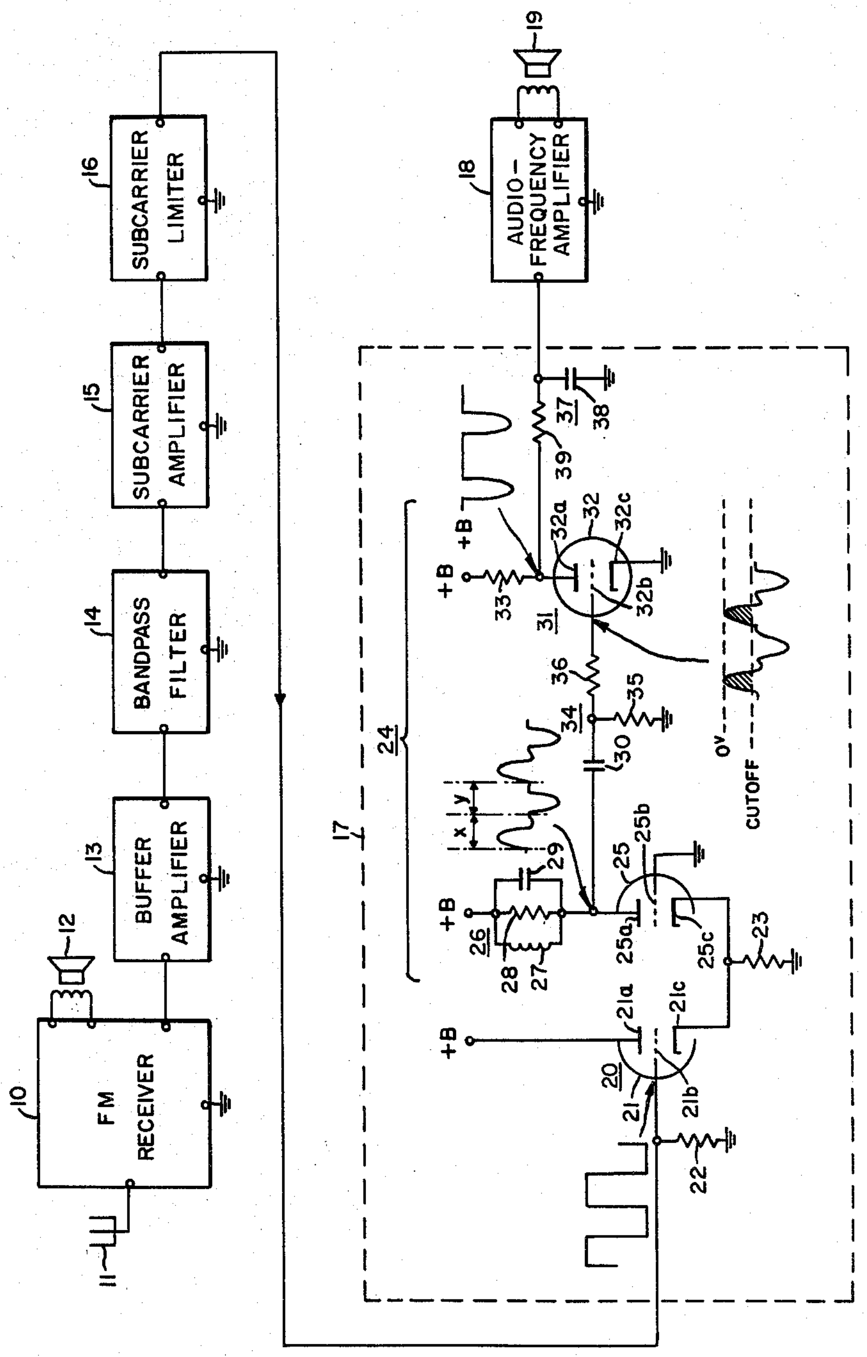

This invention relates to apparatus for detecting the the modulation of a frequency-modulated signal. The apparatus has particular application in improving the audio recovery of a counter-type detector used to detect the modulation of a frequency-modulated subcarrier of a frequency-modulated multiplex signal. The invention will, therefore, be described in this environment.

The frequency-modulated multiplex signal mentioned above may be an SCA (Subsidiary Communications Authorization) type signal wherein a subcarrier in the order of 50 kilocycles is frequency-modulated by a subcarrier modulating signal. The main carrier, in the order of 100 megacycles and representative of an FM broadcast channel frequency, is frequency-modulated by both a main modulating signal and the frequency-modulated subcarrier signal. Thus, two modulating signals are transmitted in one channel and on one main carrier which is representative of the channel frequency. At the receiving end, the main modulating signal and subcarrier are detected and separated and the subcarrier modulating signal, in turn, is detected from the subcarrier.

The main modulating signal may be the usual program material and the subcarrier modulating signal may be the familiar subscription type material heard as background music in restaurants, stores, and offices. In another form, this multiplex technique may be used for stereo broadcasting.

The conventional technique of detecting the modulation of the frequency-modulated subcarrier signal with a counter-type detector is to amplify and limit the subcarrier signal and to then differentiate the limited signal. Next, either the positive or negative differentiated pulses are counted or integrated in an integrating circuit to derive an audio-frequency signal having an amplitude which varies in proportion to changes in the repetition-frequency of the pulses which are counted and which is, therefore, representative of the modulation of the frequency-modulated subcarrier signal. The amplitude of this audio-frequency signal naturally is dependent upon the area under or the energy of the differentiated pulses which are counted. Any attempt to increase the amplitude of the audio-frequency signal by merely increasing the time constant of the differentiating circuit to derive differentiated pulses having longer durations and higher average amplitudes results in degradation of the linearity of the detector since at high frequencies the differentiated pulses will have insufficient time to decay to approximately zero before the occurrence of the next differentiated pulse. In order to derive an audio-frequency signal which is truly representative of the modulation of the frequency-modulated subcarrier signal, it is necessary that the amplitude variations of this audi-frequency signal be dependent only upon the changes in repetition-frequency of the pulses counted. Variations in amplitude due to changes in the energy content of the pulses which are counted result in loss of linearity; the energy content of the pulses which are counted must be constant.

The present invention is directed to a detector wherein these pulses which are counted are formed or shaped to have a greater area or energy content than the energy content of conventionally derived differentiated pulses and when counted these pulses do not cause the linearity of the detector to be degraded. This provides an audio-frequency signal at the output of the detector which has a greater amplitude than one derived by conventional techniques and this detector is said to have an improved audio recovery.

In accordance with the present invention apparatus for measuring the repetition rate of a supplied repetitive signal comprises means for developing a series of groups of oscillations, one group for each cycle of the repetitive signal, and means for developing at least one high energy pulse from each group of oscillations, and for deriving from the high energy pulses, an output signal representative of the repetition rate of the repetitive signal.

Also in accordance with the present invention apparatus for detecting the modulation of a supplied frequency-modulated signal comprises means for developing a series of groups of oscillations, one group for each cycle of the frequency-modulated signal, and means for developing at least one high-energy pulse from each group of oscillations and for deriving from the high energy pulses an output signal representative of the modulation of the frequency-modulated signal.

For a better understanding of the present invention, together with other and further objects thereof, reference is had to the following description, taken in connection with the accompanying drawings, and its scope will be pointed out in the appended claims.

Figure 2A:
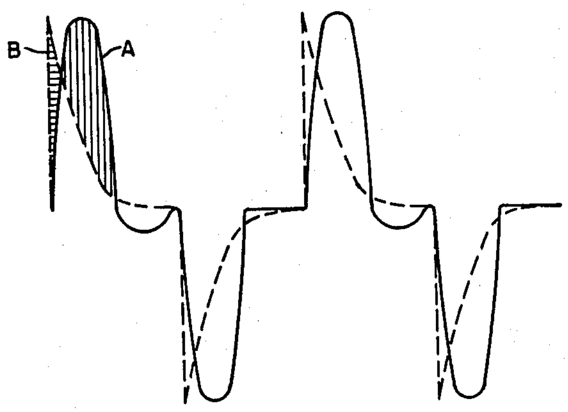
Figure 2B:
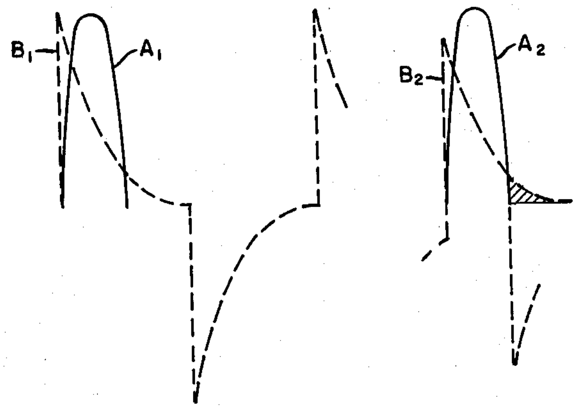

Referring to the drawings:

FIG. 1 is a circuit diagram, partly schematic, representing a complete frequency-modulation carrier signal receiver and a subcarrier unit which includes apparatus for detecting the modulation of a frequency-modulated subcarrier signal constructed in accordance with the present invention, and FIGS. 2*a* and 2*b* show voltage wave forms useful in understanding the advantages of the detector apparatus of the present invention.

*Description and operation of FIG. 1 apparatus*

Referring to FIG. 1 there is represented a complete frequency-modulation carrier signal receiver 10 of conventional construction along with a subcarrier unit which includes apparatus for detecting the modulation of a frequency-modulated subcarrier signal constructed in accordance with the present invention. The receiver 10 may include the usual circuits normally found in such a device. In particular, the receiver 10, having its input terminal connected to an antenna 11, may include a radio-frequency amplifier, an oscillator-modulator, an intermediate-frequency amplifier, a frequency-modulation detector, and an audio-frequency amplifier, all of conventional construction, for deriving, in the usual manner, an audio-frequency signal representing the main modulating signal. Such a signal may be reproduced, in a conventional manner, by a sound reproducer 12.

Connected in cascade with the receiver 10 is a subcarrier unit composed of a buffer amplifier 13, a bandpass filter 14, a subcarrier amplifier 15, a subcarrier limiter 16, a subcarrier detector 17 shown within dotted lines and more fully described hereinafter, an audio-frequency amplifier 18, and a sound reproducer 19. All the elements in the subcarrier unit except for the subcarrier detector 17 may be of conventional construction and operate in the usual manner. The input circuit of the buffer amplifier 13 is connected to the detector output, before de-emphasis, of the receiver 10. The buffer amplifier 13 serves to partially attenuate the main modulating signal audio-frequency component and to minimimze distortion since harmonics of the main modulating signal may fall within the subcarrier pass band and result in crosstalk. The bandpass filter 14, having a pass band substantially equal to the maximum frequency deviation of the subcarrier signal and centered approximately at the subcarrier frequency, further attenuates the main channel audio-frequency signal developed by the detector of the receiver 10 as well as noise signals in the frequency ranges above and below this pass band. The bandpass filter 14, therefore, passes only the subcarrier signal. The subcarrier signal, in turn, is amplified by the subcarrier amplifier 15 and is amplitude limited by the subcarrier limiter 16. The amplitude-limited subcarrier signal is supplied to the subcarrier detector 17, the operation of which will be described more fully hereinafter, whereat an audio-frequency signal representative of the modulation of the frequency-modulated subcarrier signal is derived which is, in turn, amplified by the audio-frequency amplifier 18 and reproduced by the sound reproducer 19 in a conventional manner.

*Description and operation of FIG. 1 subcarrier detector*

Referring more particularly to the subcarrier detector 17 constructed in accordance with the present invention, this detector may include an amplifier 20 composed of an electron device 21 (57 IRE 7.52; Institute of Radio Engineers Standards) shown as a vacuum tube triode having an anode 21*a* connected directly to a source of positive potential indicated by +B; a control electrode 21*b* connected to ground through a resistor 22; and a cathode 21*c* connected to ground through a resistor 23. The amplitude-limited frequency-modulated subcarrier signal developed by the subcarrier limiter 16 and shown by the wave form diagram connected to the lead line to the control electrode 21*b* is supplied to this control electrode. Amplifier 20 serves as an additional stage for amplitude-limiting the signal supplied from the subcarrier limiter 16 and the final amplitude-limited signal is developed across resistor 23.

The subcarrier detector 17 also includes means 24, indicated by the brackets, for developing a series of high-energy pulses, one pulse for each cycle of the frequency-modulated subcarrier signal. In particular, means 24 may include an electron device 25 shown as a vacuum tube triode having an anode 25*a*, a grounded control electrode 25*b*, and a cathode 25*c* connected to ground also through resistor 23. The final amplitude-limited signal developed across resistor 23 is supplied to the cathode 25*c* of vacuum tube 25 thereby alternately rendering this vacuum tube conductive and nonconductive. Vacuum tube 25 is rendered conductive by the negative-going portions of the amplitude-limited signal since the control electrode 25*b* is grounded and is rendered nonconductive by the positive-going portions of the amplitude-limited signal.

Means 24 may also include a damped tuned circuit 26, composed of the parallel combination of an inductor 27, a resistor 28, and a capacitor 29, connected between the anode 25*a* of vacuum tube 25 and a source of positive potential indicated by +B. The damped tuned circuit 26 develops a series of groups of damped oscillations in response to the conduction and nonconduction periods of vacuum tube 25. During periods of nonconduction of vacuum tube 25 magnetic energy which has been previously stored in the inductor 27 is released and causes a damped oscillatory current to exist in the damped tuned circuit. Since vacuum tube 25 does not sufficiently load the damped tuned circuit 26, additional damped oscillations occur during conduction periods of this vacuum tube. However, a sufficient amount of energy is stored in the inductor 27 during each conduction period of vacuum tube 25 and this energy is, as previously explained, released during the nonconduction period which follows. The wave form diagram connected to the lead line to the anode 25*a* of vacuum tube 25 shows two groups of damped oscillations developed by the damped tuned circuit 26 in response to two conduction and two nonconduction periods of the vacuum tube caused by two cycles of the amplitude-limited frequency-modulated subcarrier signal supplied to the cathode 25*c*. Each group of damped oscillations is shown to be composed of oscillations developed during the nonconduction period indicated by the character "*x*" and oscillations developed during the conduction period indicated by the character "*y*."

The groups of damped oscillations are coupled to an amplifier 31 which may be composed of an electron device 32 shown as a vacuum tube triode having an anode 32*a* connected to a source of positive potential indicated by +B through a resistor 33; a control electrode 32*b*; and a grounded cathode 32*c*. Amplifier 31 may also be composed of an input circuit 34, having a pair of resistors 35 and 36 along with a coupling capacitor 30 for effectively biasing vacuum tube 32 in such a manner as to clamp the peaks of the first half-cycles of oscillation of each group of oscillations to ground. This action is shown in the wave form diagram connected to the lead line to the control electrode 32*b* of vacuum tube 32. Amplifier 31 amplifies that portion of each first half-cycle of oscillation lying above the cutoff level of vacuum tube 32 and develops a series of high-energy pulses from the first half-cycles of oscillation at the anode 32*a*. These portions which are amplified are indicated by the cross-hatched parts of the wave form diagram connected to the lead line to the control electrode 32*b* of vacuum tube 32. Any succeeding cycles of oscillation having amplitudes smaller than the first half-cycle of oscillation and which lie below the cutoff level of vacuum tube 32 are naturally not amplified and therefore are effectively removed. The high-energy pulses developed from the first half-cycles of oscillation of each group of oscillations are shown in the wave form diagram connected to the lead line to the anode 32*a* of vacuum tube 32. Since one group of damped oscillations is developed for each cycle of the frequency-modulated subcarrier signal, one high-energy pulse is developed at the anode 32*a* for each cycle of the subcarrier signal.

At this point it is worthwhile to compare the characteristics of the high-energy pulses developed at the anode 32*a* of vacuum tube 32 with the characteristics of the previously-mentioned differentiated pulses derived by conventional techniques. FIG. 2*a* is useful in making this comparison. The solid wave form A represents a typical voltage wave form of two groups of damped oscillations developed by the damped tuned circuit 26 in response to two cycles of the amplitude-limited subcarrier signal supplied to the cathode 25*c* of vacuum tube 25. The dotted wave form B represents a typical voltage wave form of conventionally derived differentiated pulses that may be developed from two cycles of the amplitude-limited subcarrier signal. Neglecting the negative portions of the groups of oscillations and the negative differentiated pulses and considering only the positive first half-cycles of oscillation and the positive differentiated pulses, it is seen from FIG. 2*a* that for equal amplitude differentiated pulses and first half-cycles, the area or energy content of the first half-cycles is substantially greater than that of the differentiated pulses. This difference in energy content is indicated by the vertically-hatched area minus the horizontally-hatched area and any area under that portion of the differentiated pulse following the first half-cycle of oscillation. The amplifier 31 serves two purposes: it amplifies a substantial portion of the first half-cycles of oscillation thereby developing even greater high-energy pulses and it removes any succeeding lower-amplitude cycles of oscillation. The second function is achieved by the arrangement of the input circuit 34 and the cutoff level of vacuum tube 32. All cycles of oscillation which are to be removed must lie below the cutoff level of vacuum tube 32. With regard to the energy content of the high-energy pulses developed at the anode 32*a* of vacuum tube 32, this is dependent upon the gain of the amplifier 31 and the conduction period of vacuum tube 32. The conduction period is, in turn, dependent upon the amplitude of the first half-cycles of oscillation and the cutoff level of vacuum tube 32. For a given cutoff level, it may be advantageous to use a smaller amplitude first half-cycle of oscillation to permit conduction of vacuum tube 32 for a greater period thus resulting in wider pulses at the anode 32*a*. An efficient compromise must be made between the cutoff level of vacuum tube 32 and the amplitude of the first half-cycles of oscillation which results in the maximum conduction period of the vacuum tube. In other words, the cutoff level of vacuum tube 32 should be as close as possible to the base line of wave form A but it should be great enough that succeeding cycles of oscillation lie below it. Once this is achieved it is obvious that the energy content of the pulses developed at the anode 32*a* of vacuum tube 32 may be substantially greater than the energy content of conventionally derived differentiated pulses since the average width of these pulses is greater than the average width of the conventionally derived differentiated pulses.

The subcarrier detector 17 additionally includes means 37 for deriving a signal representative of the modulation of the frequency-modulated subcarrier signal from the high-energy pulses developed by the amplifier 31. Means 37 may be a conventional integrating circuit composed of a capacitor 38 and a resistor 39 which integrates or counts the high-energy pulses and develops an audio-frequency signal across capacitor 38 having an amplitude which varies in accordance with the changes in repetition frequency of the high-energy pulses or more particularly the modulation of the subcarrier signal.

As previously mentioned, any attempt to increase the audio recovery of the conventional detectors by merely increasing the time constant of the differentiated pulses results in degradation of the linearity of the detector. This may be most readily understood by referring to FIG. 2*b*. In this figure the solid wave forms $A_1$, $A_2$ represent typical voltage wave forms of two first half-cycles of oscillation of two groups of damped oscillations developed by the damped tuned circuit 26 in response to the amplitude-limited subcarrier signal supplied to the cathode 25*c* of vacuum tube 25 and the dotted wave forms $B_1$, $B_2$ represent typical voltage wave forms of conventionally derived differentiated pulses corresponding to two steady-state frequencies. The time constant of the differentiated pulses shown in FIG. 2*b* is greater than the time constant of the differentiated pulses shown in FIG. 2*a*. It is seen in FIG. 2*b* that the differentiated pulses of wave form $B_2$, developed from a higher frequency of the amplitude-limited frequency-modulated signal than the differentiated pulses of wave form $B_1$, have insufficient time to decay to approximately zero before the occurrence of the next differentiated pulse. There is also a reduction in the peak-to-peak amplitude of the differentiated pulses of the higher-frequency wave form. However, the slope of the exponential curve of this wave form is somewhat reduced. Thus, there is an area or energy loss in the higher-frequency differentiated pulses due to the reduction in their peak-to-peak amplitude and an insufficient time to decay, but this loss is slightly offset by the somewhat more gradual decay. Part of the loss is shown by the cross-hatched portion of FIG. 2*b*. In order to derive an audio-frequency signal truly representative of the modulation of the frequency-modulated subcarrier signal with a counter-type detector, it is necessary that the amplitude variations be dependent only upon the changes in repetition-frequency of the frequency-modulated signal. In other words the area or energy content of the pulses which are counted must be constant. The amplitude variations of the audio-frequency signal derived under conditions such as shown in FIG. 2*b* will naturally also be dependent upon the variations in area or energy content of the pulses which are counted. This results in a degradation in linearity of the detector. Thus, the frequency of the damped tuned circuit 26 must be adjusted so that the period of the first half-cycle of oscillation does not exceed one-half of the shortest possible period of one cycle of the frequency-modulated subcarrier signal. Such a condition corresponds to the maximum instantaneous frequency of the frequency-modulated subcarrier signal. If this condition is satisfied no degradation in linearity occurs for the frequency-modulation detector constructed in accordance with the present invention since each first half-cycle is fully completed before vacuum tube 25 is driven back into conduction. Since the energy content of the first half-cycles of oscillation developed by the tuned circuit 26 is constant and is determined by the circuit parameters, all the pulses developed at the anode 32*a* of vacuum tube 32 will have the same energy content thereby ensuring accurate detection of the modulation of the frequency-modulated subcarrier signal.

While applicant does not wish to be limited to any particular set of circuit constants, the following have proved useful in a frequency-modulation detector as represented in FIG. 1.

| | | |
|---|---|---|
| Vacuum tube 21 | | ½12AU7 |
| Resistor 22 | kilohms | 470 |
| Resistor 23 | ohms | 330 |
| Vacuum tube 25 | | ½12AU7 |
| Inductor 27 | millihenries | 15.4 |
| Resistor 28 | kilohms | 15 |
| Capacitor 29 | micromicrofarads | 82 |
| Capacitor 30 | do | 220 |
| Vacuum tube 32 | | 6C4 |
| Resistor 33 | kilohms | 22 |
| Resistor 35 | megohms | 4.7 |
| Resistor 36 | kilohms | 100 |
| Capacitor 38 | micromicrofarads | 150 |
| Resistor 39 | kilohms | 470 |
| +B | volts | 150 |
| Subcarrier frequency | kilocycles | 35–65 |

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for measuring the repetition rate of a supplied repetitive signal comprising: means for developing a series of groups of oscillations, one group for each cycle of said repetitive signal; and means for developing at least one high-energy pulse from each group of oscillations, and for deriving, from said high-energy pulses, an output signal representative of the repetition rate of said repetitive signal.

2. Apparatus for detecting the modulation of a supplied frequency-modulated signal comprising: means for developing a series of groups of oscillations, one group for each cycle of said frequency-modulated signal; and means for developing at least one high-energy pulse from each group of oscillations, and for deriving, from said high-energy pulses, an output signal representative of the modulation of said frequency-modulated signal.

3. Apparatus for detecting the modulation of a supplied frequency-modulated signal comprising: an electron device alternately rendered conductive and nonconductive by said frequency-modulated signal; a tuned circuit responsive to said electron device for developing a series of groups of oscillations, one group for each cycle of said frequency-modulated signal; means for developing high-energy pulses from said first half-cycles of oscillation of each group of oscillations; and means for deriving a signal representative of said modulation of said frequency-modulated signal from said high-energy pulses, said derived signal having an improved audio recovery.

4. Detecting apparatus in accordance with claim 3 wherein the tuned circuit is damped and the groups of oscillations are synchronized with each cycle of said frequency-modulated signal.

5. Detecting apparatus in accordance with claim 4 wherein the first half cycles of oscillation of each group of oscillations have the same energy content and any cycle of oscillation succeeding the first cycle of each group is removed.

6. Apparatus for detecting the modulation of a supplied frequency-modulated subcarrier signal comprising: means for developing a series of groups of oscillations, one group for each cycle of said frequency-modulated subcarrier signal; means for developing high-energy pulses from the first half-cycles of oscillation of each group of oscillations; and means for deriving a signal representative of said modulation of said frequency-modulated subcarrier signal from said high-energy pulses, said derived signal having an improved audio recovery.

7. Apparatus for detecting the modulation of a supplied frequency-modulated subcarrier signal comprising: means for developing a series of groups of oscillations, one group for each cycle of said frequency-modulated subcarrier signal; means for developing high-energy pulses from the first half-cycles of oscillation of each group of oscillations; and means for integrating said high-energy pulses to derive a signal representative of said modulation of said frequency-modulated subcarrier signal, said derived signal having an improved audio recovery.

8. Apparatus for detecting the modulation of a supplied frequency-modulated subcarrier signal comprising: means for developing a series of groups of oscillations, one group for each cycle of said frequency-modulated subcarrier signal and the first half-cycles of oscillation of each group having the same energy content; means for developing equal high-energy pulses from said first half-cycles of oscillation of each group of oscillation; and means for deriving a signal representative of said modulation of said frequency-modulated subcarrier signal from said high-energy pulses, said derived signal having an improved audio recovery.

9. Apparatus for detecting the modulation of a supplied frequency-modulated subcarrier signal comprising: means for developing a series of groups of damped oscillations, one group for each cycle of said frequency-modulated subcarrier signal and the first half-cycles of oscillation of each group having the same energy content; means for developing equal high-energy pulses from said first half-cycles of oscillation of each group of oscillations and for removing any succeeding cycles of oscillation of said groups; and means for integrating said high-energy pulses to derive a signal representative of said modulation of said frquency-modulated subcarrier signal, said derived signal having an improved audio recovery.

10. Apparatus for detecting the modulation of a supplied frequency-modulated subcarrier signal comprising: a first electron device alternately rendered conductive and nonconductive by said frequency-modulated subcarrier signal; a damped tuned circuit responsive to said electron device for developing a series of groups of damped oscillations, one group for each cycle of said frequency-modulated sub-carrier signal and the first half-cycles of oscillation of each group having the same energy content; a second electron device, biased to clamp the peaks of said first half-cycles of oscillation of each group of oscillations to ground, for amplifying that portion of each first half-cycle lying above the cutoff level of said device thereby developing equal high-energy pulses from the first half-cycles of each group of oscillations and for removing any succeeding cycles of oscillation of said groups having amplitudes smaller than said first half-cycle and which lie below said cutoff level; and means for deriving a signal representative of said modulation of said frequency-modulated subcarrier signal from said high-energy pulses, said derived signal having an improved audio recovery.

11. Apparatus for detecting the modulation of a supplied frequency-modulated subcarrier signal comprising: means for amplitude-limiting said frequency-modulated subcarrier signal; a first vacuum tube, having an anode, a grounded control electrode and a cathode which is supplied with said amplitude-limited frequency-modulated subcarrier signal, alternately rendered conductive and nonconductive by said amplitude-limited frequency-modulated subcarrier signal; a damped tuned circuit responsive to said first vacuum tube for developing a series of groups of damped oscillations, one group for each cycle of said frequency-modulated sub-carrier signal and the first half-cycles of oscillation of each group having the same energy content; a second vacuum tube, biased to clamp the peaks of said first half-cycles of oscillation of each group of oscillations to ground, for amplifying that portion of each first half-cycle lying above the cutoff level of said second vacuum tube thereby developing equal high-energy pulses from the first half-cycles of each group of oscillations and for removing any succeeding cycles of oscillation of said groups having amplitudes smaller than said first half-cycle and which lie below said cutoff level; and means for integrating said high-energy pulses to derive a signal representative of said modulation of said frequency-modulated subcarrier signal, said derived signal having an improved audio recovery.

12. Apparatus for detecting the modulation of a supplied frequency-modulated subcarrier signal such apparatus improving audio recovery comprising: means for amplitude-limiting said frequency-modulated subcarrier signal; a first vacuum tube, having an anode, a grounded control electrode, and a cathode which is supplied with said amplitude-limited frequency-modulated subcarrier signal, alternately rendered conductive and nonconductive by said amplitude-limited frequency-modulated subcarrier signal; a damped tuned circuit responsive to said first vacuum tube for developing a series of groups of damped oscillations, one group for each cycle of said frequency-modulated subcarrier signal and the first half-cycles of oscillation of each group having the same energy content; and a second vacuum tube, biased to clamp the peaks of said first half-cycles of oscillation of each group of oscillations to ground, for amplifying that portion of each first half-cycle lying above the cutoff level of said second vacuum tube thereby developing equal high-energy pulses whose average value is representative of the modulation of said frequency-modulated subcarrier signal from the first half-cycles of each group of oscillations and for removing any succeeding cycles of oscillation of said groups having amplitudes smaller than said first half-cycle and which lie below said cutoff level.

References Cited by the Examiner

UNITED STATES PATENTS

| | | | |
|---|---|---|---|
| 2,415,093 | 2/47 | Gerwin | 328—65 |
| 2,441,957 | 5/48 | De Rosa | 329—128 |
| 2,531,494 | 11/50 | Atwood et al. | 325—325 |
| 2,672,552 | 3/54 | Comte | 328—65 |
| 2,947,863 | 8/60 | Buie | 329—127 |
| 2,961,609 | 11/60 | Manring | 328—35 |
| 3,010,066 | 11/61 | Kwast | 324—82 X |
| 3,028,556 | 4/62 | Du Vall | 328—136 |

FOREIGN PATENTS

| | | |
|---|---|---|
| 652,408 | 4/51 | Great Britain. |

BENNETT G. MILLER, *Primary Examiner.*

L. MILLER ANDRUS, ALFRED L. BRODY, ROY LAKE, *Examiners.*